United States Patent [19]

Coggins, Jr.

[11] 3,976,045

[45] Aug. 24, 1976

[54] STONE CUTTING MACHINE

[76] Inventor: B. Frank Coggins, Jr., 250 Dogwood Lane, Elberton, Ga. 30635

[22] Filed: Feb. 28, 1975

[21] Appl. No.: 554,156

[52] U.S. Cl. .............................. 125/12; 125/13 R; 125/16 R
[51] Int. Cl.² .......................................... B28D 1/02
[58] Field of Search .................... 125/12, 13, 16, 21

[56] References Cited
UNITED STATES PATENTS

| | | | |
|---|---|---|---|
| 125,804 | 4/1872 | Gear | 125/12 |
| 2,187,299 | 1/1940 | Burkhardt | 125/13 R |
| 2,382,257 | 8/1945 | Ramsay | 125/13 R X |
| 2,570,700 | 10/1951 | Marcerou | 125/13 R |
| 2,795,222 | 6/1957 | Garrison | 125/21 |
| 2,896,605 | 7/1959 | Thompson | 125/16 R |
| 3,110,579 | 11/1963 | Benson | 125/15 X |
| 3,451,386 | 6/1965 | Naito | 125/13 R |
| 3,675,972 | 7/1972 | Slomito | 125/16 R |

Primary Examiner—Harold D. Whitehead
Attorney, Agent, or Firm—Newton, Hopkins & Ormsby

[57] ABSTRACT

A stone cutting machine is disclosed comprising a frame, a sliding beam movably supported on the frame, and one or more flexible wires having a plurality of cutting or honing segments projecting from the periphery thereof carried tautly by the beam. Motor means are provided for rotating and axially reciprocating the wire and for moving the sliding beam supporting the wire on the frame.

1 Claim, 9 Drawing Figures

STONE CUTTING MACHINE

BACKGROUND OF THE INVENTION

This invention relates generally to stone cutting machines, and particularly to machines for cutting blocks of stone into slabs or for cutting in situ into bedrock.

For over a century various machines have been devised for cutting stone. Early attempts to develop apparatus to perform this task is exemplified by that disclosed in U.S. Pat. No. 125,804 which comprises a spindle mounted for rotation in a pair of spaced bearings with the surface of the spindle studded with black diamonds or carbon points. In effect the device works in the manner of a modern hand-held jigsaw and is capable of being used in cutting tortuous paths through relatively thin stone such as marble slabs or slate.

Stone cutting machines have since evolved from this early type of device to the point where today they are quite large and powerful and capable of handling large scale operations in extracting stone from quarries or in cutting large blocks into individual slabs. One type of such modern stone cutting machine employs large rotatable discs having diamonds impregnated in the disc teeth along the rim or impregnated in cutting segments affixed to the sides of the discs. Another type modern day machine employs an endless wire mounted to rotatable sheaves spanning spaced towers erected in a quarry. While revolving tautly along an endless path, the wire is urged against stone while an abrasive material suspended or mixed in a liquid carrier is delivered to the cutting area upon the wire. U.S. Pat. Nos. 2,795,222 and 3,098,475 exemplify these types of stone cutting machines. The present invention is more closely related to this latter type.

Although wire type stone cutting machines are in wide use today they are not without attendant problems. For example, where relatively short endless wires are used they must usually be supported on relatively large sheaves to achieve proper speeds. The rapid spinning of such large sheaves causes clouds of finely cut particles to form in the adjacent atmosphere. The clouds settle out on adjacent equipment and create equipment maintenance problems and may create a health hazard to attendant personnel. Local wind conditions may also cause the cloud to drift thereby polluting the atmosphere downwind the machine. Where relatively long wires are used, such as those which span distances of from 100 to 1000 feet over a quarry floor, weather conditions can bring operations to a halt. Furthermore, darkness can also force shutdown since during nighttime operations it is difficult to notice when a wire has jumped off its tracks quick enough to prevent damage to equipment. These relatively large wire cutting machines also require substantial power availability and, of course, require the presence of large open spaces. The need for particulated abrasives is also quite undesirable due to their purchase and storage costs and handling difficulties.

Accordingly, it is a general object of the present invention to provide an improved stone cutting machine.

More specifically, it is an object of the present invention to provide a machine for cutting relatively hard stones such as granite and the like which machine may be used in cutting bedrock or excavated blocks of stone.

Another object of the invention is to provide a stone cutting machine which does not tend to create substantial air pollution in the vicinity of machine operations or downwind thereof.

Another object of the invention is to provide a stone cutting machine which does not require the use of abrasive materials.

Another object of the invention is to provide a stone cutting machine of the type described which can effect stone cutting, honing and buffing and which also may effect such in a single operation.

Yet other objects of the invention are to provide a stone cutting machine of the type described which is relatively light in weight, versatile in operation, does not require high powered driving means, and which can effect relatively smooth and accurate cuts within relatively small spaces.

SUMMARY OF THE INVENTION

In one form of the invention a stone cutting machine is provided comprising a flexible wire having a plurality of cutting segments projecting from the periphery thereof, means for holding taut and rotating the flexible wire, and means for urging the flexible wire while tautly rotating against a stone to effect a stone cutting operation.

In another form of the invention a stone cutting machine is provided comprising a frame, a sliding beam movably supported on the frame, at least one flexible wire carried tautly by the sliding beam, and motor means mounted on the beam for rotating the taut flexible wire.

DETAILED DESCRIPTION OF THE DRAWING

Figure 1:
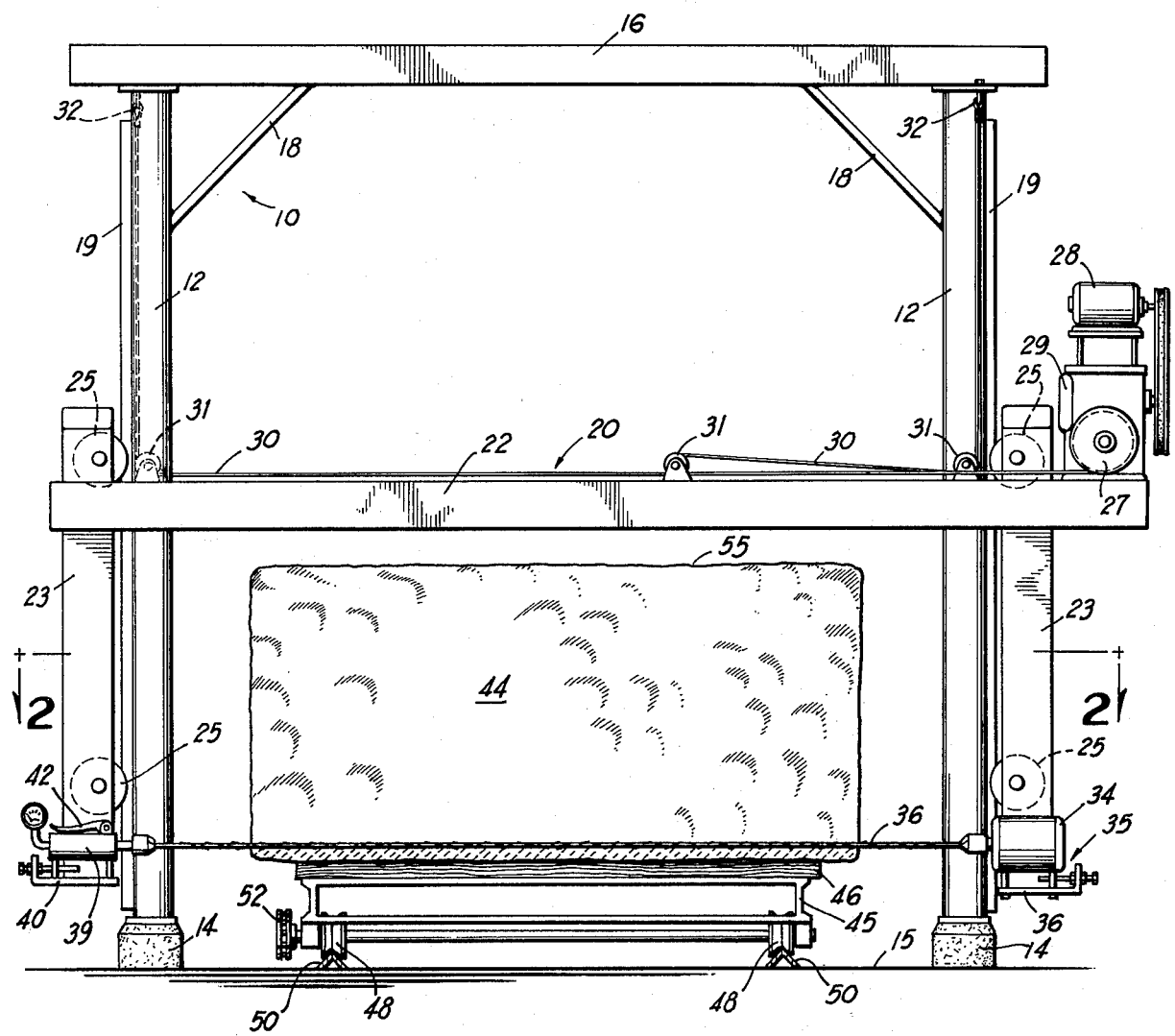
FIG. 1 is a front view, in elevation, of a stone cutting machine embodying principles of the present invention in a preferred form shown in the process of cutting a stone.
Figure 2:
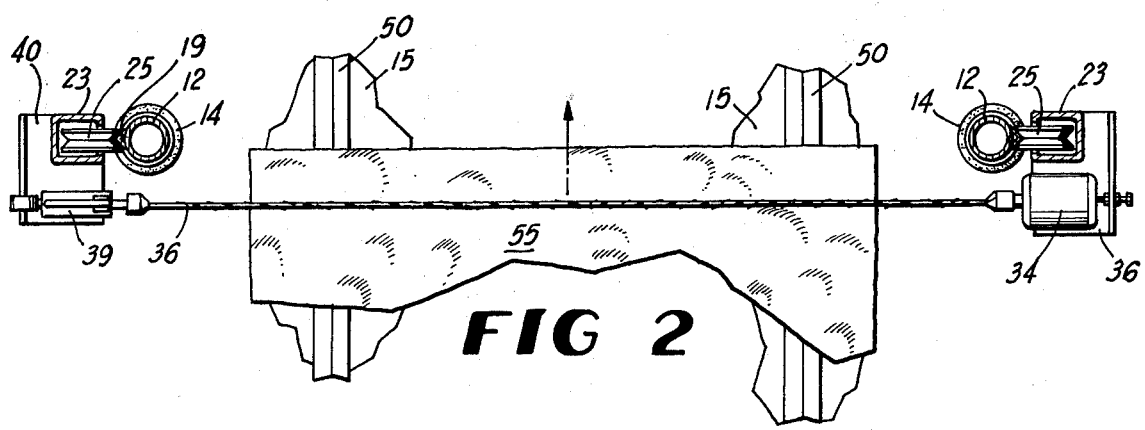
FIG. 2 is a top view, in cross section, of the machine shown in FIG. 1.

Referring now in more detail to the drawing, there is shown in FIGS. 1 and 2 a stone cutting machine comprising a stationary frame 10 having a pair of laterally spaced tubular stanchions 12 mounted atop a pair of concrete pillows 14 partially embedded in supporting ground terrain 15. A lateral beam 16 is rigidly mounted atop stanchions 12 and ruggedized by a pair of struts 18. A pair of vertical V-shaped rails 19 are rigidly mounted to outwardly facing surfaces of stanchions 12.

Slidably mounted to frame 10 is a sliding beam assembly 20 comprising a pair of lateral beam members 22 rigidly mounted to opposing faces of a pair of upright beam members 23 straddling stanchions 12. To each of the upright beam members are rotatably mounted a pair of wheels 25 upon rails 19 secured to the stanchions. A wench 27 is mounted atop one end of the lateral beam members powered by an electric motor 28 through a gear reducer 29. A pair of cables 30 wound on the wench extend over a set of pulleys 31 to the top of each stanchion 12 where their ends are secured by eye bolts 32. Another electric motor 34 is mounted by a motor mount 35 atop a platform 36 depending from the bottom of one of the upright beam members 23. A flexible wire 36 is axially secured to the output shaft of motor 34 and to an hydraulic jack 39 mounted atop a platform 40 depending from the bottom of the other upright beam member 23. The hydraulic jack may be manually pumped by a jack handle 42 to draw wire 36 tautly between the frame stanchions 12 beneath the sliding beam. A meter is also provided to gauge the wire tension.

In operation, a stone 44 may be positioned atop a dolly 45 upon a sheet of wood 46. The dolly is supported with its wheels 48 rotatably disposed atop a pair of inverted V-shaped rails 50 extending through the machine over ground terrain 15. A chain 52 mounted to a sprocket on one side of the dolly may be then driven by unshown motor means in urging the stone into position beneath the sliding beam assembly 20. Motor 34 may then be energized to rapidly rotate wire 36. The speed of wire rotation varies is in proportion to the hardness of the particular stone to be cut. Typical speeds range between some 4000 RPM and 20,000 RPM.

From a raised position the sliding beam is lowered by wench 27 bringing the rotating wire into engagement with the top surface 55 of the stone. As the wench continues to descend very slowly, a constant downfeed is provided causing the wire continuously to frictionally engage the stone. During this action water is sprayed onto the wire and into the stone incision being formed from a set of unshown sprinklers depending from the lateral beam members 22. The cutting action continues as wench 27 slowly lowers the sliding beam assembly until the rotating wire has made a vertical cut substantially through the stone. When the cut has been completed, the direction of operation of the wench 27 is reversed causing the sliding beam to rise and bring the rotating wire out through the interstice formed in the stone back to its original raised position. Chain 52 may then drive dolly 45 a predetermined distance forward and the cutting operation repeated. Another vertical cut to the stone parallel to the just formed cut creates a generally rectangular slab. This operation may be repeated a number of times until the stone has been depleted.

Figure 3:
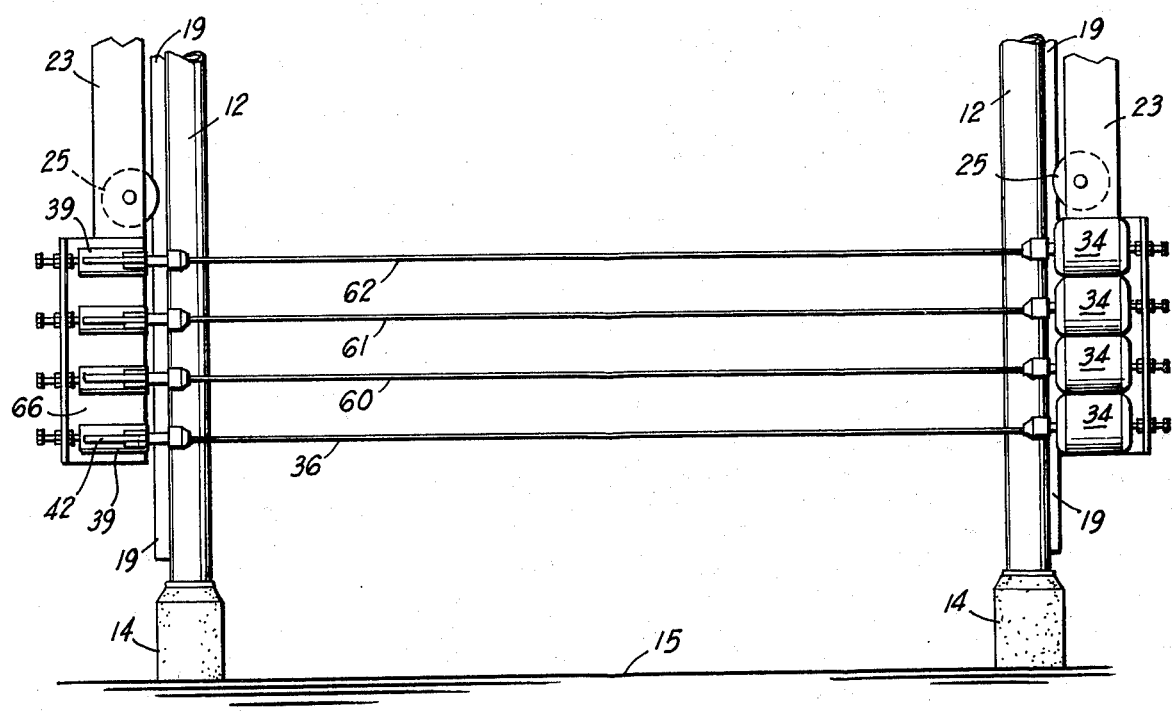
FIG. 3 is a front view, in elevation, of a stone cutting machine embodying principles of the invention in another form.

Referring next to FIG. 3, a modification of the stone cutting machine just described is shown which includes a plurality of wires. The lowermost cutting wire 36 extends from electric motor 34 beneath the pair of horizontal beam members of the sliding beam assembly to hydraulic jack 39 which here has been mounted to a vertical platform 66 rather than to a horizontal platform 40 as in the previous embodiment. With this mounting the hydraulic jack is oriented 90° from that orientation shown in FIG. 1. Here, three other mutually spaced wires 60, 61 and 62 are mounted tautly in juxtaposition with wire 36 and with all four wires being disposed along a common vertical plane. Whereas wire 36 is here again used for cutting, wire 60 immediately thereabove functions as a rough honing wire. Wire 61 serves in turn as a fine honing while wire 62 functions as a buffer. In one specific embodiment used in cutting granite, wire 36 is of 40/50 US mesh size, wire 60 of 260 US mesh, wire 61 of 600/800 US mesh, and wire 62 encapsulated in tubular felt. In this embodiment each of the four wires is seen to be driven by an independent electric motor in a gang of motors but it should be understood, of course, that a single power supply in conjunction with suitable power transmission means may be alternatively employed.

Operation of the machine shown in FIG. 3 is similar to that shown in FIGS. 1–2 with the exception that descent of the sliding beam brings each of the wires successively into working engagement with the stones. Thus, wire 36 serves to make the initial cut, wire 60 to perform a rough honing action, wire 61 to perform a fine honing action, and wire 62 to buff. In using this modification sufficient distance should be supplied beneath the stone to enable the entire set of four wires to pass substantially completely therethrough. The use of this modification enables stone cutting, honing and buffing operations all to be performed with a single reciprocal motion of the sliding beam. Though here, as with the previously described operation, the cut is made along a vertical plane, cuts may, of course, be performed along other planes and paths.

Figure 4:
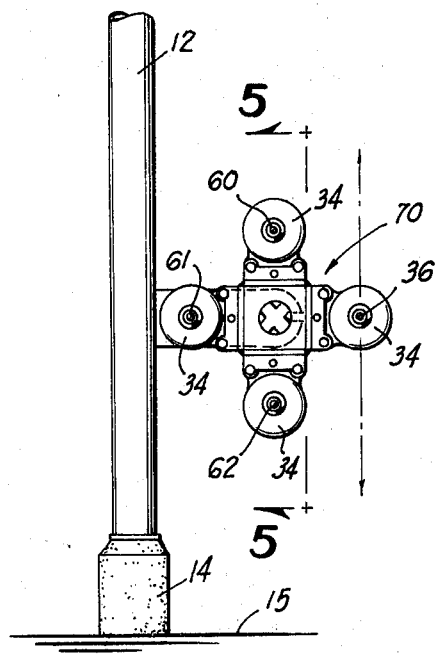
FIG. 4 is a side elevational view of a portion of a stone cutting machine embodying principles of the invention in another form viewed from within the machine facing outwardly.
Figure 5:
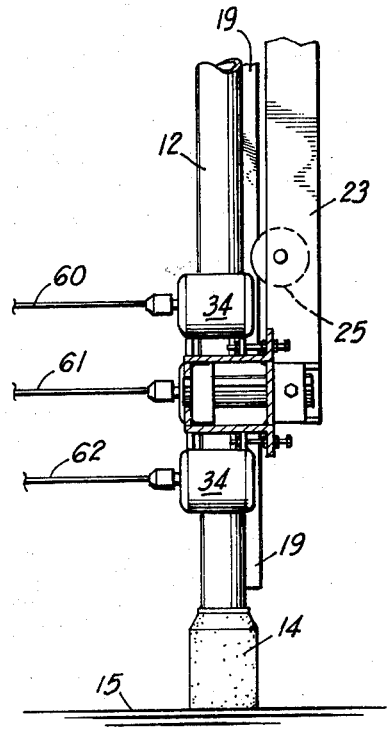
FIG. 5 is a front elevational view of that portion of the machine shown in FIG. 4.

Referring next to FIGS. 4 and 5, another modification is shown of a machine which also employs a plurality of wires. Here, however, the four wires are not all disposed along a common plane but are rather mounted to a pair of indexing mechanisms 70 respectively supported on the bottom of the sliding beam assembly. With this arrangement the wires may be sequentially passed through the stone with the indexing mechanism being rotated 90° following the passage of each wire individually therethrough. For example, wire 34 is here shown in position for cutting. Following its use the indexing mechanism may be rotated one quarter turn clockwise, as viewed in FIG. 4, thereby bringing wire 60 into operative position. Subsequent quarter turns bring wires 61 and 62 likewise into operative position.

Figure 6:
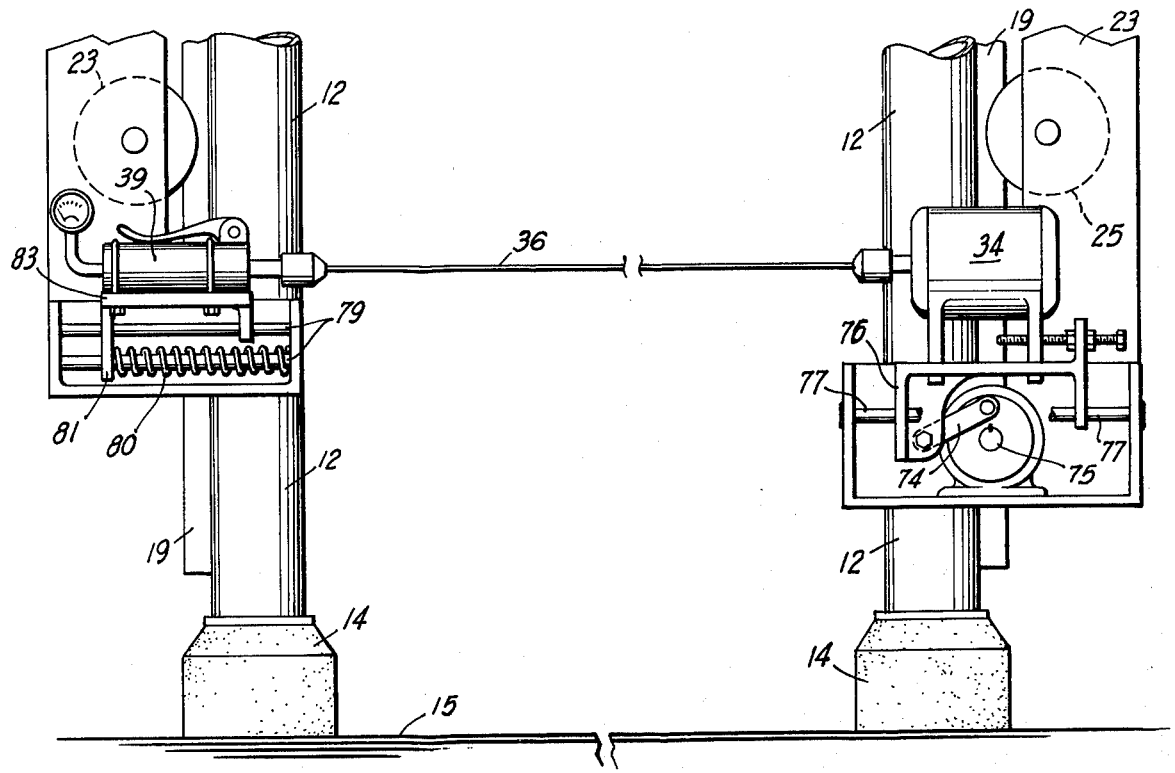
FIG. 6 is a front view, in elevation, of a stone cutting machine embodying principles of the invention in yet another form.

Referring next to FIG. 6, yet another modification is shown which enables the wire not only to rapidly spin in performing a cutting operation but also to reciprocate. Reciprocal movement is often desirable in order to enhance evenness of wear of the wire itself as well as to produce a finer, more accurate incision in the stone. Reciprocation is provided by yet another electric motor mounted to the sliding beam having a crank arm 74 coupled with the motor output shaft 75. Motor 34, for rotating the wire, is itself mounted atop a sliding platform which is reciprocally driven along horizontal rods 77 by the crank arm. An hydraulic cylinder 39 supported on the opposite upright member 23 of the sliding beam is slidably mounted on another horizontal pair of bars 79 for reciprocal, horizontal movement accompanying that imparted by the motor and crank. A compression spring 80 mounted to the lowermost of the two horizontal bars 79 abuts a pendant 81 from platform 83 upon which the hydraulic cylinder is rigidly mounted. With this arrangement the wire 36 is continuously maintained in a taut condition during reciprocation with the spring continuously urging the wire to the left, as viewed in this Figure. Preferably, the compression spring has substantial length to bias the wire with substantially constant force. Other more sophisticated constant tensioning devices may, of course, be substituted.

Figure 7:
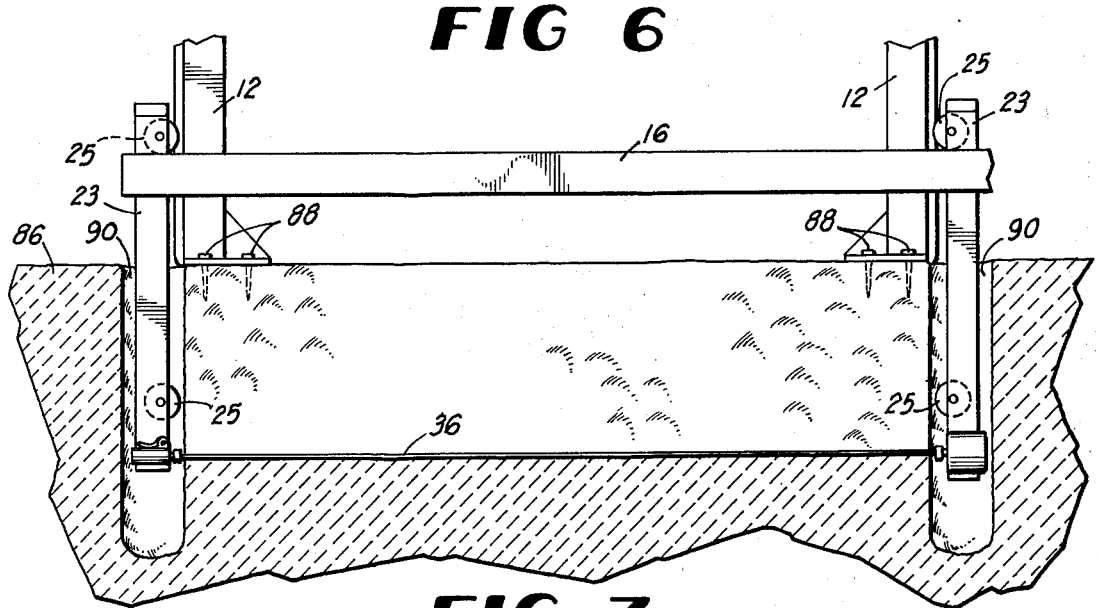
FIG. 7 is a front view, in elevation, of a stone cutting machine embodying principles of the invention in still another form.

In FIG. 7 the stone cutting machine is seen to be adapted for in situ cutting operations, such as in a quarry, to form cuts in bedrock 86. Stanchions 12 are here secured by fastening means 88 atop a unitary section of the bedrock and tubular holes 90 drilled vertically into the rock just outboard the stanchions. The holes 90 are drilled sufficiently deep to enable the upright members 23 of the sliding beam to descend thereinto as a downfeed is applied to the wire atop the bedrock.

Figure 8:
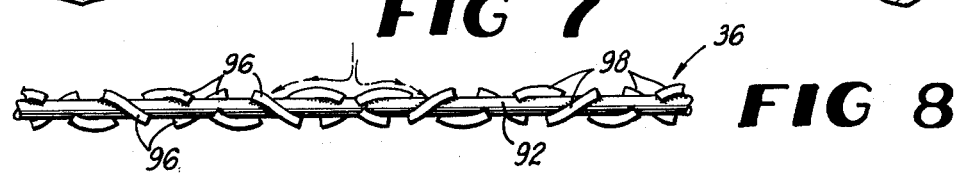
FIGS. 8 and 9 are detailed elevational views of a portion of stone cutting wires which may be used in the machines shown in the other Figures.
Figure 9:
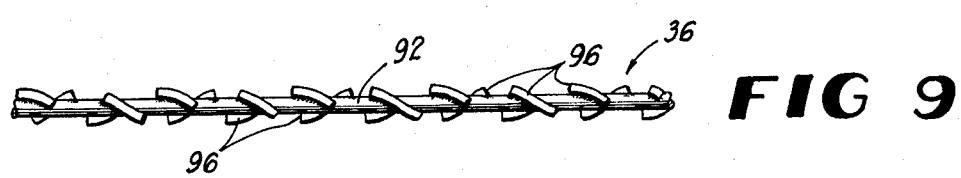

In FIGS. 8 and 9 are provided more detailed illustrations of a wire which may be used with the machine. The wire 36 here is seen to comprise a single strand of steel 92 having two sets of cutting segments projecting helically thereabout. The segments are preferably formed with diamond chips impregnated in relatively hard metal such as cobalt, brass, tungsten, carbides and alloys thereof. Preferably, the segments are sintered. The segments in FIG. 8 are seen to form right-hand helical turns to the left of wire center and left-hand helical turns to the right of center. Conversely, the segments in FIG. 9 are all of right-hand turn pattern. The advantage provided by the reversing helical turn segments of FIG. 8 is that it enables cuttings to be forced out of both ends of the rotating wire. This can be more effective than that provided by forcing the segments out of one side of the stone incision particularly when the wire is axially reciprocated for in this latter case stone cuttings will be periodically located on unexposed wire as it oscillates in and out each side of the stone.

It should be understood, of course, that many other modifications, additions or deletions may be made to the specifically illustrated embodiments just illustrated without departure from the spirit and scope of the invention as set forth in the following claims.

What is claimed is:

1. A stone cutting machine comprising a frame; a sliding beam movably supported on said frame; at least one flexible wire carried tautly by said sliding beam; motor means mounted on said sliding beam for rotating said taut flexible wire; second motor means for reciprocally moving said sliding beam on said frame; third motor means for axially reciprocating said taut flexible wire while said motor means rotates said wire and said second motor means reciprocally moves said sliding beam on said frame; a honing wire and a buffing wire carried tautly by said sliding beam; motor means for rotating said honing and buffing wires; and index means for interchanging the positions of said flexible wire, said honing wire and said buffing wire.

* * * * *